US009111127B2

(12) United States Patent
Oh et al.

(10) Patent No.: US 9,111,127 B2
(45) Date of Patent: Aug. 18, 2015

(54) IMAGE PROCESSING APPARATUS AND METHOD FOR THREE-DIMENSIONAL (3D) IMAGE

(71) Applicant: Samsung Electronics Co., Ltd., Suwon-si (KR)

(72) Inventors: Byung Tae Oh, Seoul (KR); Du Sik Park, Suwon-si (KR); Jae Joon Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 162 days.

(21) Appl. No.: 13/908,271

(22) Filed: Jun. 3, 2013

(65) Prior Publication Data
US 2013/0322738 A1 Dec. 5, 2013

(30) Foreign Application Priority Data
Jun. 4, 2012 (KR) .......................... 10-2012-0059789

(51) Int. Cl.
*G06K 9/00* (2006.01)
*H04N 19/597* (2014.01)
*H04N 19/196* (2014.01)
*H04N 19/46* (2014.01)
*H04N 19/126* (2014.01)
*H04N 19/136* (2014.01)
*H04N 19/86* (2014.01)

(52) U.S. Cl.
CPC .......... *G06K 9/00201* (2013.01); *H04N 19/126* (2014.11); *H04N 19/136* (2014.11); *H04N 19/197* (2014.11); *H04N 19/46* (2014.11); *H04N 19/597* (2014.11); *H04N 19/86* (2014.11)

(58) Field of Classification Search
None
See application file for complete search history.

(56) References Cited

U.S. PATENT DOCUMENTS

| 6,055,330 A | 4/2000 | Eleftheriadis et al. | |
| 2008/0247670 A1 | 10/2008 | Tam et al. | |
| 2010/0141757 A1* | 6/2010 | Baik et al. | 348/135 |
| 2010/0195898 A1 | 8/2010 | Bang et al. | |
| 2011/0305383 A1* | 12/2011 | Lee et al. | 382/154 |
| 2012/0020549 A1* | 1/2012 | Lee et al. | 382/154 |

FOREIGN PATENT DOCUMENTS

| EP | 2410747 | 1/2012 |
| JP | 2000-278715 | 10/2000 |
| JP | 2000-349644 | 12/2000 |
| KR | 10-0611301 | 8/2006 |
| KR | 10-0711508 | 5/2007 |
| KR | 10-0853201 | 8/2008 |
| KR | 10-2010-0083980 | 7/2010 |

(Continued)

OTHER PUBLICATIONS

Extended European Search Report dated Sep. 24, 2013 in European Patent Application No. 13170352.2.
International Search Report dated Sep. 30, 2013 in International Patent Application No. PCT/KR2013/004926.

(Continued)

*Primary Examiner* — Amara Abdi
(74) *Attorney, Agent, or Firm* — Staas & Halsey LLP

(57) ABSTRACT

An image processing apparatus and method for a three-dimensional (3D) image is provided. The image processing apparatus may include a parameter setting unit to set a first parameter related to a color image, and a parameter determining unit to determine an optimal second parameter related to a depth image, using the first parameter.

20 Claims, 6 Drawing Sheets

(56) References Cited

FOREIGN PATENT DOCUMENTS

| KR | 10-2011-0055820 | | 5/2011 | | |
|---|---|---|---|---|---|
| KR | 10-2012-0018906 | * | 3/2012 | ............... | H04N 7/26 |

OTHER PUBLICATIONS

Woo-Shik Kim et al., "Depth Map Coding with Distortion Estimation of Rendered View", Visual Information Processing and Communication, SPIE vol. 7543, 2010, pp. 75430B-1-754306-10.

* cited by examiner

IMAGE PROCESSING APPARATUS AND METHOD FOR THREE-DIMENSIONAL (3D) IMAGE

CROSS-REFERENCE TO RELATED APPLICATIONS

This application claims the priority benefit of Korean Patent Application No. 10-2012-0059789, filed on Jun. 4, 2012, in the Korean Intellectual Property Office, the disclosure of which is incorporated herein by reference.

BACKGROUND

1. Field

Embodiments relate to an image processing apparatus and method for a three-dimensional (3D) image, and more particularly, to an apparatus and method that may improve a quality of a synthesized image for a 3D image while maintaining an identical bit amount.

2. Description of the Related Art

A three-dimensional (3D) image may be generated by synthesizing a color image and a depth image. That is, the 3D image may be realized through a synthesized image acquired by synthesizing the color image and the depth image. Accordingly, a depth image may be transmitted to reproduce the 3D image.

In this instance, a quality of the synthesized image may be affected by the color image and the depth image. Accordingly, minimizing degradation in quality of the color image and the depth image may be required. Simultaneously, optimal bit amounts of the color image and the depth image may need to be maintained.

That is, there is a desire for an image processing method that may maintain a quality of an intermediate image at a predetermined level when determining bit amounts required for transmitting a color image and a depth image.

SUMMARY

In an aspect of one or more embodiments, there is provided an image processing apparatus, including a parameter setting unit to set a first parameter related to a color image, and a parameter determining unit to determine an optimal second parameter related to a depth image, using the first parameter.

The parameter determining unit may determine the second parameter based on a relationship between the color image and the depth image.

The parameter determining unit may determine the second parameter, using a distortion function of a synthesized image acquired by synthesizing the depth image and the color image.

The parameter determining unit may determine a second parameter that satisfies conditions related to a change in distortion of the color image and a change in distortion of the depth image, with respect to an identical bit amount.

The parameter determining unit may determine the second parameter variably for each of a plurality of frames or for each group of pictures (GOP).

In an aspect of one or more embodiments, there is provided an image processing apparatus, including a distortion setting unit to set a distortion of a color image and a distortion of a depth image that are related to a distortion of a synthesized image, and a parameter determining unit to determine a quantization parameter for the depth image, based on the distortion of the color image and the distortion of the depth image.

The parameter determining unit may determine a quantization parameter for the depth image that satisfies conditions related to a change in the distortion of the color image and a change in the distortion of the depth image, with respect to an identical bit amount.

The distortion of the depth image may correspond to a distortion of the synthesized image acquired by synthesizing the color image and the depth image.

In an aspect of one or more embodiments, there is provided an image processing method, including setting a first parameter related to a color image, and determining an optimal second parameter related to a depth image, using the first parameter.

In an aspect of one or more embodiments, there is provided an image processing method, including setting a distortion of a color image and a distortion of a depth image that are related to a distortion of a synthesized image, and determining a quantization parameter for the depth image, based on the distortion of the color image and the distortion of the depth image.

In an aspect of one or more embodiments, there is provided an image processing method, including determining an optimal second quantization parameter for a depth image corresponding to a first quantization parameter of a color image, quantizing the color image using the first quantization parameter, and encoding the color image, and quantizing the depth image using the second quantization parameter, and encoding the depth image.

In an aspect of one or more embodiments, there is provided an image processing method, including determining an optimal second quantization parameter for a depth image corresponding to a first quantization parameter of a color image, quantizing the color image using the first quantization parameter, and encoding the color image, quantizing the depth image using the second quantization parameter, and encoding the depth image, and generating a bit stream including the encoded color image, the encoded depth image, the first quantization parameter, and the second quantization parameter.

In an aspect of one or more embodiments, there is provided an image processing method, including extracting an encoded color image and an encoded depth image from a bit stream, determining an optimal second quantization parameter for the depth image corresponding to a first quantization parameter of the color image, decoding the encoded color image, and inverse quantizing the decoded color image based on the first quantization parameter, and decoding the encoded depth image, and inverse quantizing the decoded depth image based on the second quantization parameter.

In an aspect of one or more embodiments, there is provided an image processing method, including extracting, from a bit stream, an encoded color image, an encoded depth image, a first quantization parameter related to the encoded color image, and a second quantization parameter related to the encoded depth image, decoding the encoded color image, and inverse quantizing the decoded color image based on the first quantization parameter, and decoding the encoded depth image, and inverse quantizing the decoded depth image based on the second quantization parameter. Here, the second quantization parameter may be determined based on the first quantization parameter.

According to an aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
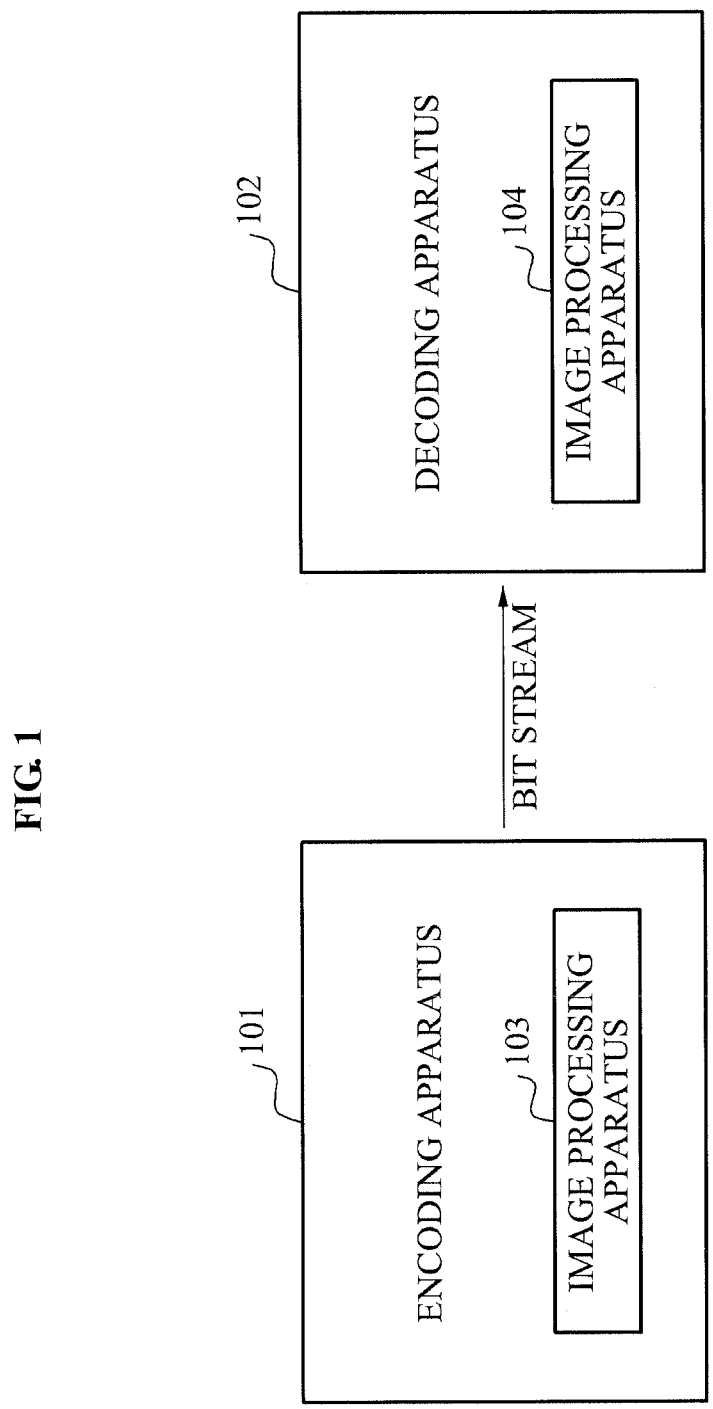
FIG. 1 illustrates an operation of an image processing apparatus according to embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an operation of an image processing apparatus according to embodiments.

Referring to FIG. 1, an encoding apparatus 101 may include an image processing apparatus 103. Similar to the encoding apparatus 101, a decoding apparatus 102 may include an image processing apparatus 104.

In order to generate an intermediate image by synthesizing a color image and a depth image for a three-dimensional (3D) image, the image processing apparatus 103 and the image processing apparatus 104 may determine a quantization parameter used when a quality of the intermediate image is set. In this instance, the quality of the intermediate image may be determined based on a distortion of the color image and a distortion of the depth image. That is, as the distortion of the color image and the distortion of the depth image increase, the quality of the intermediate image may decrease. In particular, such a distortion may be changed based on quantization parameters to be applied to the color image and the depth image. As the quantization parameters become greater, the distortion may increase, whereas bit amounts required for compression may decrease conversely.

The image processing apparatus 103 and the image processing apparatus 104 may determine optimal quantization parameters in order to generate an intermediate image with a quality of a predetermined level and simultaneously, to improve encoding efficiency, when a 3D image is generated.

Herein, a first parameter and a second parameter may not be limited to a quantization parameter, and may correspond to any parameters that may have an effect on qualities of the depth image and the color image. That is, the second parameter can be an optimal parameter for improving encoding efficiency while maintaining a quality of the synthesized image. For the purposes of explanation and as examples, embodiments will be provided based on a quantization parameter.

Figure 2:
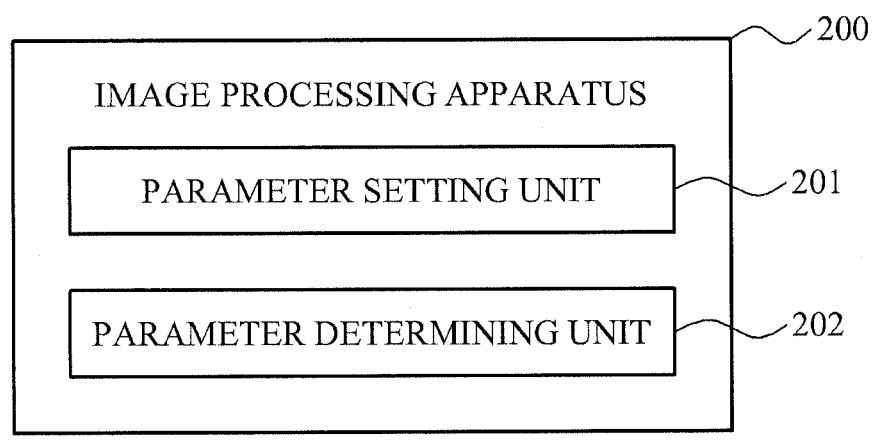
FIG. 2 illustrates a configuration of an image processing apparatus according to embodiments.

FIG. 2 illustrates a configuration of an image processing apparatus 200 according to embodiments.

Referring to FIG. 2, the image processing apparatus 200 may include a parameter setting unit (parameter setter) 201, and a parameter determining unit (parameter determiner) 202.

The parameter setting unit 201 may set a first parameter related to a color image. Here, the first parameter may correspond to a quantization parameter to be used when the color image is compressed.

The parameter determining unit 202 may determine an optimal second parameter related to a depth image, using the first parameter. Here, the second parameter may correspond to a quantization parameter to be used when the depth image is compressed.

Since a correspondence relationship between the depth image and the color image is relatively high, an optimal quantization parameter for the depth image related to a quantization parameter for the color image may be determined by analyzing the correspondence relationship between the color image and the depth image. Accordingly, the parameter determining unit 202 may determine the second parameter, based on the correspondence relationship between the color image and the depth image.

In particular, the parameter determining unit 202 may determine the second parameter, using a distortion function of a synthesized image acquired by synthesizing the depth image and the color image. In this instance, the distortion function of the synthesized image may be determined based on a distortion of the color image and a distortion of the depth image.

The parameter determining unit 202 may determine a second parameter that satisfies conditions related to a change in the distortion of the color image and a change in the distortion of the depth image, with respect to an identical bit amount. An operation of the parameter determining unit 202 will be described in detail with reference to FIG. 4.

For example, the parameter determining unit 202 may determine the second parameter variably for each of a plurality of frames, or for each group of pictures (GOP). That is, the parameter determining unit 202 may determine the second parameter at predetermined time intervals. Accordingly, determining a parameter may be suitable for a case in which fast processing of an image is required, for example, for a real time broadcast, and the like.

Figure 3:
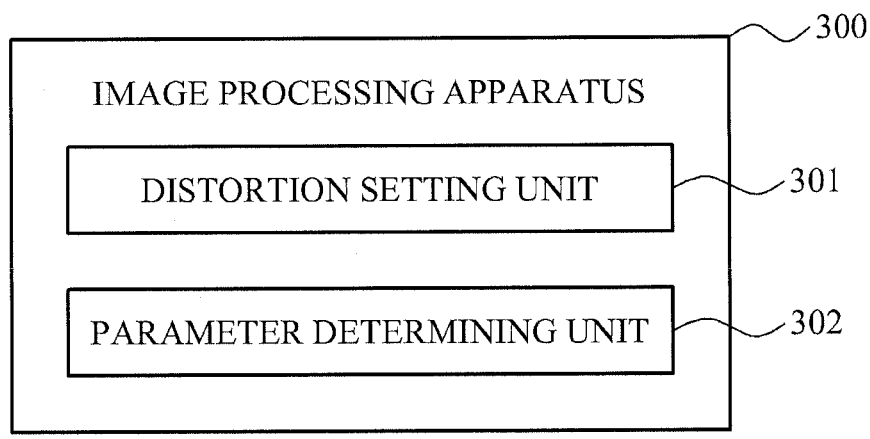
FIG. 3 illustrates a configuration of an image processing apparatus according to embodiments.

FIG. 3 illustrates a configuration of an image processing apparatus 300 according to other embodiments.

Referring to FIG. 3, the image processing apparatus 300 may include a distortion setting unit (distortion setter) 301, and a parameter determining unit (parameter determiner) 302.

The distortion setting unit 301 may set a distortion of a color image and a distortion of a depth image that are related to a distortion of a synthesized image. Here, the distortion of the synthesized image may be determined by combining the distortion of the color image and the distortion of the depth image.

The parameter determining unit 302 may determine a quantization parameter for the depth image, based on the distortion of the color image and the distortion of the depth image. For example, the parameter determining unit 302 may determine a quantization parameter that satisfies conditions related to a change in the distortion of the color image and a change in the distortion of the depth image, with respect to an identical bit amount. In this instance, the distortion of the depth image may correspond to the distortion of the synthesized image acquired by synthesizing the color image and the depth image.

Figure 4:
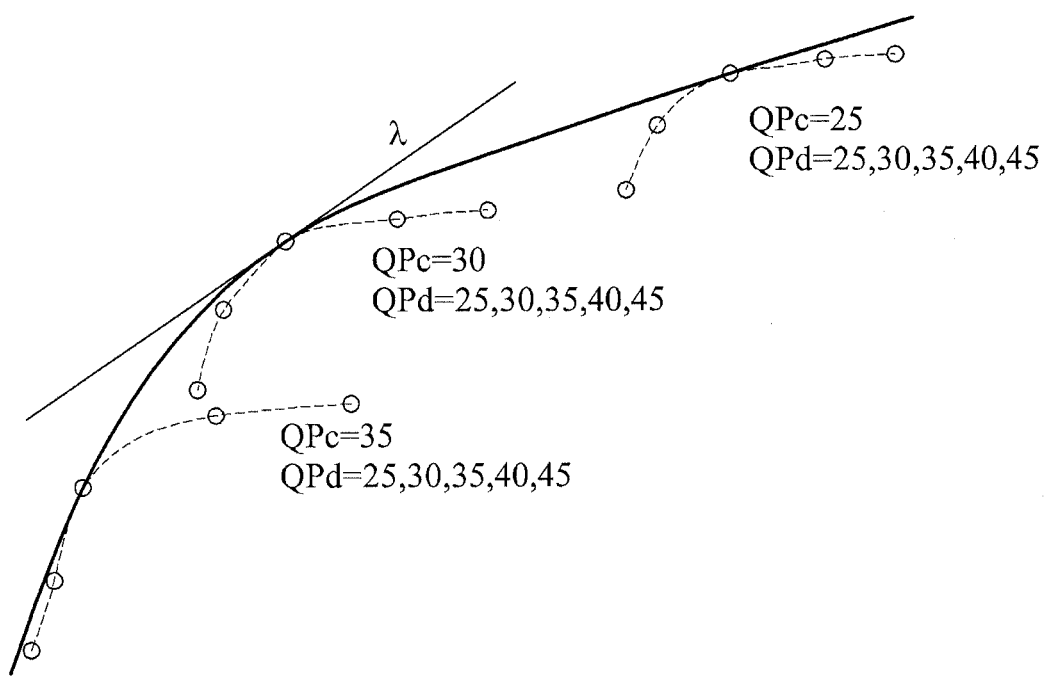
FIG. 4 illustrates a change in a distortion according to a change in a quantization parameter of a color image, and a change in a quantization parameter of a depth image according to embodiments.

FIG. 4 illustrates a change in a distortion according to a change in a quantization parameter of a color image, and a change in a quantization parameter of a depth image according to embodiments.

Referring to FIG. 4, it may be assumed that a quantization parameter QPc of the color image is fixed, and a quantization parameter QPd of the depth image is variable. An image processing apparatus may determine an optimal quantization parameter for the depth image that may improve encoding efficiency while maintaining a quality of the synthesized image. In this instance, the optimal quantization parameter for the depth image may be disposed on a curve illustrated in FIG. 4. Here, the curve may indicate a case in which optimal bit amounts are allocated to the color image and the depth image.

A distortion of a synthesized image acquired by synthesizing a color image and a depth image, with respect to a 3D image, may be derived, as expressed in Equation 1.

$$D_V = \sum_i \left| \frac{\delta}{2} [\, |\tilde{C}_i - \tilde{C}_{i-1}| + |\tilde{C}_i - \tilde{C}_{i+1}| \,] \right| D_i - \tilde{D}_i |^2 \quad \text{[Equation 1]}$$

$$\approx E \left| \frac{\delta}{2} [\, |\tilde{C}_i - \tilde{C}_{i-1}| + |\tilde{C}_i - \tilde{C}_{i+1}| \,] \right|^2 \cdot \sum_i |D_i - \tilde{D}_i|^2$$

$$= \Sigma^2 \cdot D_D$$

In Equation 1, $D_V$ denotes a distortion of a synthesized image at an intermediate point of view, C denotes a color image, and D denotes a depth image. δ denotes a constant that may be determined based on a set value of a camera parameter. In particular, $D_D$ denotes a distortion of the depth image. That is, according to Equation 1, an effect of the distortion of the depth image on the distortion of the synthesized image may be understood.

An actual distortion of the synthesized image may be determined based on a distortion occurring when the color image and the depth image are compressed, as expressed in Equation 2.

$$D_{syn} = \alpha \cdot D_C + \beta \cdot D_V \quad \text{[Equation 2]}$$

$D_{syn}$ denotes a distortion of a synthesized image when a color image and a depth image are synthesized. $D_C$ denotes a distortion of the color image, or a distortion of the synthesized image caused by the distortion of the color image. $D_V$ denotes a distortion of the synthesized image caused by a distortion of the depth image. In addition, α denotes a weight by which the distortion of the color image affects the distortion of the synthesized image, and β denotes a weight by which the distortion of the depth image affects the distortion of the synthesized image, respectively.

Based on Equation 2, optimal bit amounts to be allocated to the color image and the depth image may be derived using Equation 3.

$$\frac{\alpha \Delta D_C}{\Delta R} = \frac{\beta \Delta D_V}{\Delta R} \quad \text{[Equation 3]}$$

In Equation 3, ΔR denotes a change in a bit amount. When the color image and the depth image fail to satisfy Equation 3, it may be determined that optimal bit amounts are not allocated to the color image and the depth image. That is because, although the identical ΔR is allocated, optimal bit amounts may not be allocated when the distortion of the depth image is less than the distortion of the color image, or when the distortion of the color image is less than the distortion of the depth image. In this instance, since Equation 3 may be satisfied by reducing a bit amount of one of the depth image and the color image, and allocating a bit amount corresponding to the reduced bit amount to the other of the depth image and the color image, the overall distortion may be reduced.

A left-hand side or a right-hand side of Equation 3 may be expressed as Equation 4.

$$\lambda_C = \frac{\alpha \Delta D_C}{\Delta R_C} = \alpha \frac{dD_C/dQ_C}{dR_C/dQ_C} \sim \alpha L_w Q_C^2 \quad \text{[Equation 4]}$$

$$= \frac{\beta \Delta D_V}{\Delta R_C} = \frac{\beta}{k} \frac{dD_V/dQ_D}{dR_D/dQ_D} = \frac{\beta \cdot \Sigma^2}{k} \frac{dD_D/dQ_D}{dR_D/dQ_D} \sim \frac{\beta \cdot \Sigma^2}{k} L_w Q_C^2$$

In Equation 4, $\lambda_C$ denotes a gradient at a single point on the curve of FIG. 4. $Q_C$ denotes a quantization value of the color image, and $Q_D$ denotes a quantization value of the depth image. A constant $L_W$ denotes a constant determined to obtain a relationship between Q and $\lambda_C$. A constant k denotes a ratio of a compression bit amount of the color image and a compression bit amount of the depth image when identical quantization parameters are applied. When a quantization parameter identical to a quantization parameter of the color image is applied to the depth image, a bit amount to be used for the color image is about three to five times as much as the bit amount to be used for the depth image due to a characteristic of the depth image.

For example, when a scheme of setting a quantization parameter that is used in H.264/AVC or HEVC standards is applied, Equation 4 may be expressed as Equation 5.

$$QP_D = QP_C + 3 \log_2 \frac{\alpha}{\beta} k - 3 \log_2(\Sigma^2) \quad \text{[Equation 5]}$$

In Equation 5, $QP_D$ denotes a quantization parameter for the depth image, and $QP_C$ denotes a quantization parameter of the color image. That is, the quantization parameter for the depth image may be determined based on a characteristic of the color image. In particular, the quantization parameter for the depth image may be determined based on a combination of a camera parameter value, a position of the synthesized image, the characteristic of the color image, and the like.

Referring to FIG. 4, when the quantization parameter of the color image is fixed, the quantization parameter for the depth image may be changed for allocating an optimal bit amount. In this instance, when the quantization parameter for the depth image is positioned on the curve of FIG. 4, optimal bit amounts may be allocated to the depth image and the color image. According to the foregoing scheme, a peak signal-tonoise ratio (PSNR) for quality of the synthesized image with respect to an identical bit amount may be improved.

Figure 5:
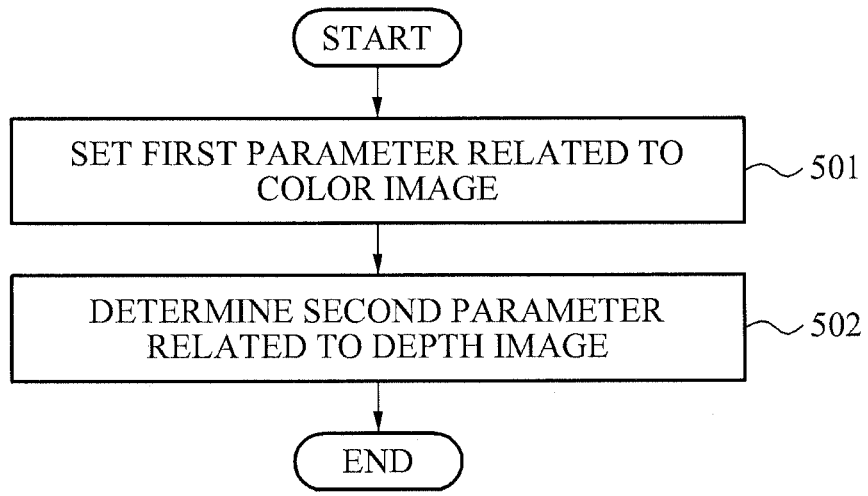
FIG. 5 illustrates an image processing method according to embodiments.

FIG. 5 illustrates an image processing method according to embodiments.

Referring to FIG. 5, in operation 501, an image processing apparatus may set a first parameter related to a color image. Here, the first parameter may correspond to a quantization parameter to be used when the color image is compressed.

In operation 502, the image processing apparatus may determine an optimal second parameter related to a depth image, using the first parameter. Here, the second parameter may correspond to a quantization parameter to be used when the depth image is compressed.

Since a relationship between the depth image and the color image is relatively high, an optimized quantization parameter for the depth image related to a quantization parameter of the color image may be determined by analyzing the relationship between the color image and the depth image. Accordingly, the image processing apparatus may determine the second parameter, based on the relationship between the color image and the depth image.

In particular, the image processing apparatus may determine the second parameter, using a distortion function of a synthesized image acquired by synthesizing the depth image and the color image. In this instance, the distortion function of the synthesized image may be determined based on a distortion of the color image and a distortion of the depth image.

The image processing apparatus may determine a second parameter that satisfies conditions related to a change in the distortion of the color image and a change in the distortion of the depth image, with respect to an identical bit amount. The foregoing operation of the image processing apparatus has been described with reference to FIG. 4.

For example, the image processing apparatus may determine the second parameter variably for each of a plurality of frames, or for each GOP. That is, the image processing apparatus may determine the second parameter at predetermined time intervals. Accordingly, determining a parameter may be suitable for a case in which fast processing of an image is required, for example, for a real time broadcast, and the like.

Figure 6:
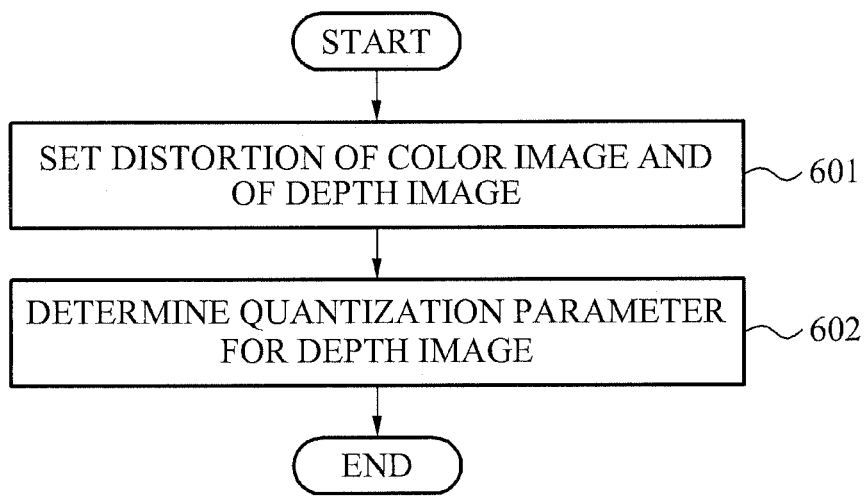
FIG. 6 illustrates an image processing method according to embodiments.

FIG. 6 illustrates an image processing method according to embodiments.

Referring to FIG. 6, in operation 601, an image processing apparatus may set a distortion of a color image and a distortion of a depth image that are related to a distortion of a synthesized image. The distortion of the synthesized image may be determined by combining the distortion of the color image and the distortion of the depth image.

In operation 602, the image processing apparatus may determine a quantization parameter for the depth image, based on the distortion of the color image and the distortion of the depth image. The image processing apparatus may determine a quantization parameter that satisfies conditions related to a change in the distortion of the color image and a change in the distortion of the depth image, with respect to an identical bit amount. In this instance, the distortion of the depth image may correspond to the distortion of the synthesized image acquired by synthesizing the color image and the depth image.

Figure 7:
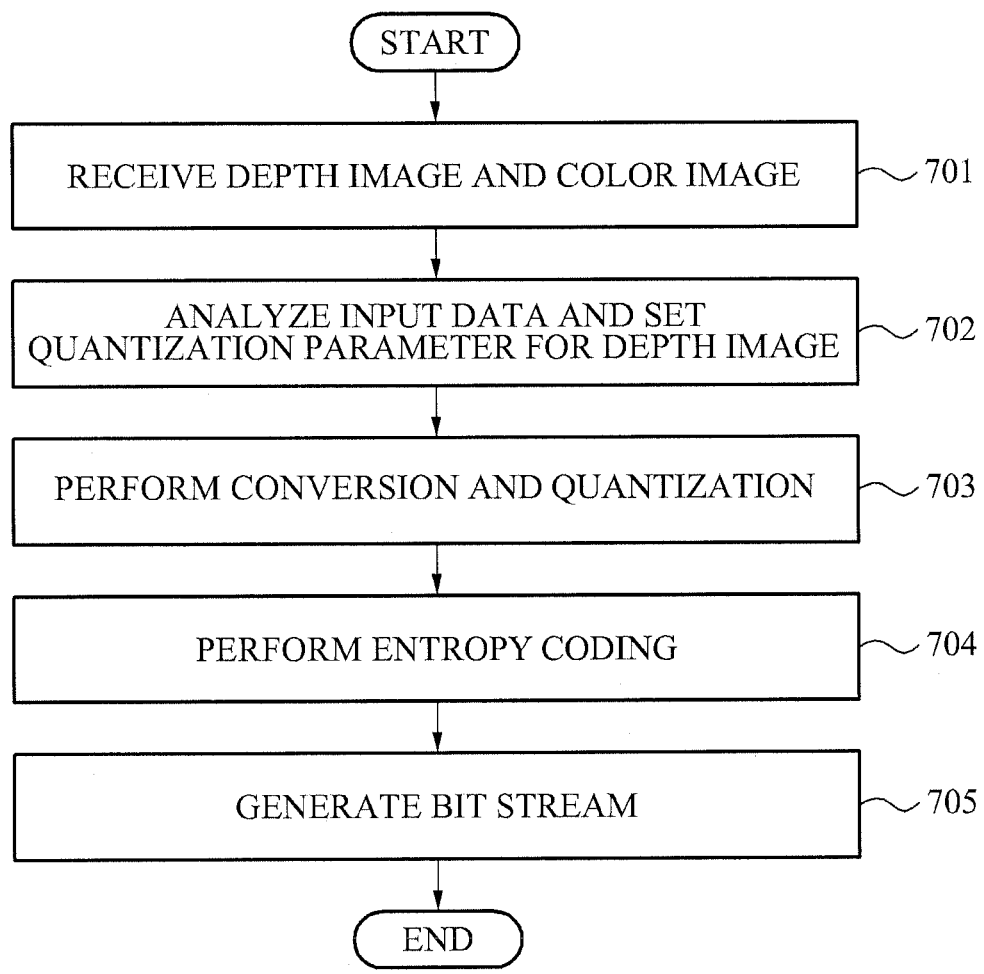
FIG. 7 illustrates an encoding process to which an image processing method is applied according to embodiments.

FIG. 7 illustrates an encoding process to which an image processing method is applied according to embodiments.

Referring to FIG. 7, in operation 701, an encoding apparatus may receive a depth image and a color image, that is, a texture video. In operation 702, the encoding apparatus may analyze the depth image and the color image corresponding to input data, and may set a quantization parameter for the depth image. Here, the quantization parameter for the depth image may be derived by schemes described with reference to FIGS. 1 through 6. In particular, the quantization parameter for the depth image may be derived based on a distortion of a synthesized image acquired by synthesizing the color image and the depth image. In this instance, the quantization parameter for the depth image may satisfy conditions related to a change in a distortion of the color image and a change in a distortion of the depth image, with respect to an identical bit amount.

In operation 703, the encoding apparatus may convert the depth image, and may quantize the depth image based on the quantization parameter for the depth image derived in operation 702.

In operation 704, the encoding apparatus may perform entropy coding with respect to the depth image. In operation 705, the encoding apparatus may generate a bit stream including the encoded depth image. The bit stream may further include an encoded color image.

For example, the bit stream may include or may not include the quantization parameter for the depth image derived in operation 703. In this instance, when the quantization parameter for the depth image is not included in the bit stream, a bit amount may be reduced since transmission of quantization parameters derived for each frame or for each GOP to a decoding apparatus may be unnecessary.

Figure 8:
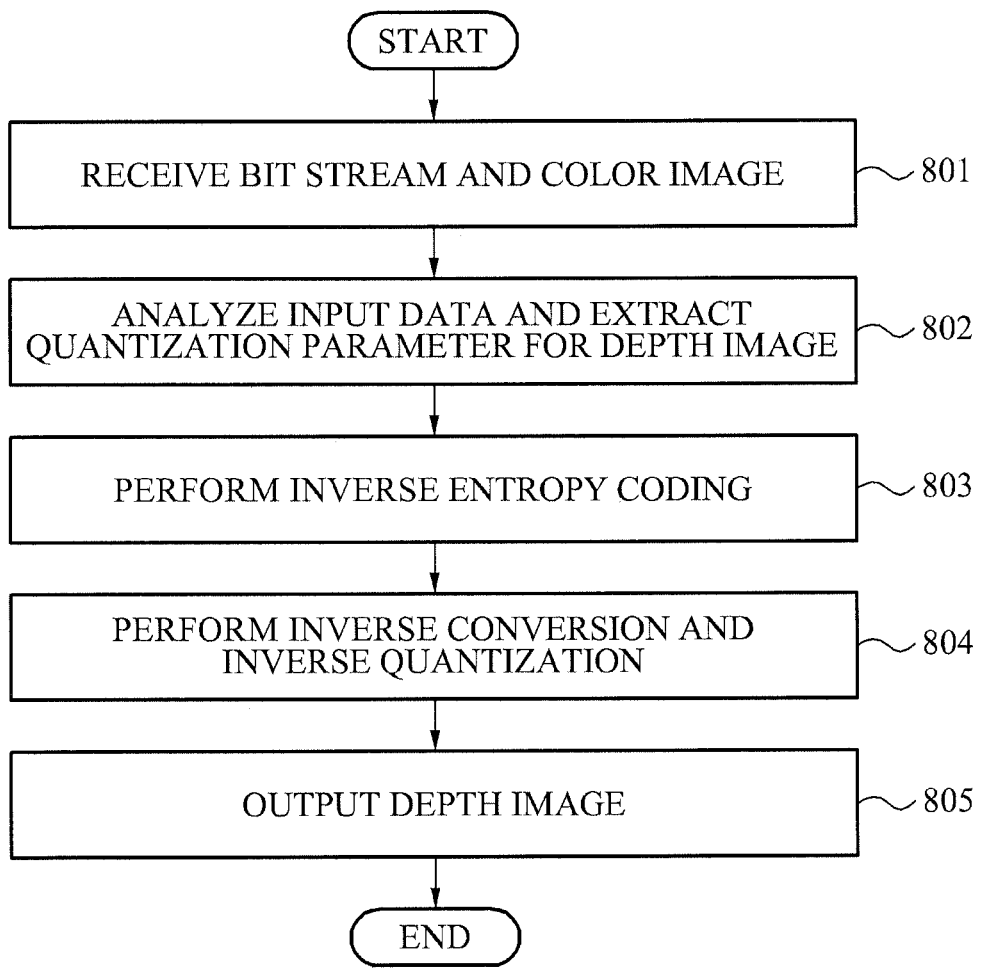
FIG. 8 illustrates a decoding process to which an image processing method is applied according to embodiments.

FIG. 8 illustrates a decoding process to which an image processing method is applied according to embodiments.

Referring to FIG. 8, in operation 801, a decoding apparatus may receive a bit stream and a color image, from an encoding apparatus. In operation 802, the decoding apparatus may analyze a depth image included in the bit stream, and the color image. In this instance, the decoding apparatus may extract a quantization parameter for the depth image from the bit stream. When the quantization parameter for the depth image derived by the encoding apparatus is not included in the bit stream, the decoding apparatus may determine a quantization parameter for the depth image for each frame or for each GOP.

In operation 803, the decoding apparatus may perform inverse entropy coding with respect to the encoded depth image. In operation 804, the decoding apparatus may perform inverse conversion with respect to the inverse entropy coded depth image, and may perform inverse quantization with respect to the depth image using the quantization parameter for the depth image. In operation 805, the decoding apparatus may output the final depth image.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the above-described embodiments may be recorded in non-transitory computer-readable media including program instructions (computer readable instructions) to implement various operations embodied by a computing device such as a computer. The computing device may have one or more processors. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). The described hardware devices may be configured to act as one or more software modules in order to perform the operations of the above-described embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although embodiments have been shown and described, it would be appreciated by those skilled in the art that changes may be made in these embodiments without departing from the principles and spirit of the disclosure, the scope of which is defined in the claims and their equivalents

What is claimed is:

1. An image processing method, comprising:
   setting a first parameter related to a color image;
   determining, using at least one processor, an optimal second parameter related to a depth image, using the first parameter;
   wherein the determining comprises determining the optimal second parameter based on a distortion of the color image and a distortion of the depth image;
   determining a distortion of a synthesized image based on a distortion occurring when the color image and the depth image are compressed; and
   deriving optimal bit amounts to be allocated to the color image and the depth image based on the distortion of the synthesized image.

2. The method of claim 1, wherein the first parameter corresponds to a quantization parameter to be used when the color image is compressed, and the second parameter corresponds to a quantization parameter to be used when the depth image is compressed.

3. The method of claim 2, wherein the first parameter is fixed and the second parameter is variable.

4. The method of claim 1, wherein the determining comprises determining the second parameter based on a relationship between the color image and the depth image.

5. The method of claim 1, wherein the determining comprises determining the second parameter, using a distortion function of a synthesized image acquired by synthesizing the depth image and the color image.

6. The method of claim 1, wherein the determining comprises determining a second parameter that satisfies conditions related to a change in distortion of the color image and a change in distortion of the depth image, with respect to an identical bit amount.

7. The method of claim 1, wherein the determining comprises determining the second parameter variably for each of a plurality of frames or for each group of pictures (GOP).

8. The method of claim 1, the method further comprises:
   setting a first parameter related to a color image;
   determining, using at least one processor, an optimal second parameter related to a depth image, using the first parameter;
   quantizing the color image using the first parameter, and encoding the color image;
   quantizing the depth image using the second parameter, and encoding the depth image;
   determining a distortion of a synthesized image based on a distortion occurring when the color image and the depth image are compressed; and
   deriving optimal bit amounts to be allocated to the color image and the depth image based on the distortion of the synthesized image.

9. The method of claim 8, the method further comprises: generating a bit stream comprising the encoded color image, the encoded depth image, the first parameter, and the second parameter.

10. An image processing apparatus, comprising:
    a distortion setter to set a distortion of a color image and a distortion of a depth image that are related to a distortion of a synthesized image;
    a parameter determiner, using at least one processor, to determine a quantization parameter for the depth image, based on the distortion of the color image and the distortion of the depth image;
    wherein the distortion setter determines the distortion of the synthesized image based on distortion occurring when the color image and the depth image are compressed; and
    wherein the distortion setter derives optimal bit amounts to be allocated to the color image and the depth image based on the distortion of the synthesized image.

11. The apparatus of claim 10, wherein the parameter determiner determines a quantization parameter for the depth image that satisfies conditions related to a change in the distortion of the color image and a change in the distortion of the depth image, with respect to an identical bit amount.

12. The apparatus of claim 10, wherein the distortion of the depth image corresponds to a distortion of the synthesized image acquired by synthesizing the color image and the depth image.

13. An image processing method, comprising:
- extracting, an encoded color image and an encoded depth image from a bit stream;
- determining, using at least one processor, an optimal second quantization parameter for the depth image corresponding to a first quantization parameter of the color image;
- decoding the encoded color image, and inverse quantizing the decoded color image based on the first quantization parameter;
- decoding the encoded depth image, and inverse quantizing the decoded depth image based on the second quantization parameter;
- wherein the encoded color image was quantized using the first parameter;
- wherein the encoded depth image was quantized using the second parameter;
- determining a distortion of a synthesized image based on a distortion occurring when the color image and the depth image are compressed; and
- deriving optimal bit amounts to be allocated to the color image and the depth image based on the distortion of the synthesized image.

14. The method of claim 13, wherein the second quantization parameter is determined based on the first quantization parameter.

15. The method of claim 13, wherein the extracting comprises extracting, from the bit stream, the first quantization parameter related to the encoded color image, and the second quantization parameter related to the encoded depth image.

16. The method of claim 13, wherein the first quantization parameter is fixed and the second quantization parameter is variable.

17. The method of claim 13, wherein the second quantization parameter is determined based on a relationship between the color image and the depth image.

18. The method of claim 13, wherein the second quantization parameter is determined based on a distortion function of a synthesized image acquired by synthesizing the depth image and the color image.

19. The method of claim 13, wherein the second quantization parameter is determined based on conditions related to a change in distortion of the color image and a change in distortion of the depth image, with respect to an identical bit amount.

20. At least one non-transitory computer-readable medium storing computer readable instructions to control at least one processor to implement the method of claim 13.

* * * * *

UNITED STATES PATENT AND TRADEMARK OFFICE
CERTIFICATE OF CORRECTION

PATENT NO. : 9,111,127 B2  
APPLICATION NO. : 13/908271  
DATED : August 18, 2015  
INVENTOR(S) : Byung Tae Oh et al.

Page 1 of 1

It is certified that error appears in the above-identified patent and that said Letters Patent is hereby corrected as shown below:

In the claims

Claim 8, Column 10, Line 27

Delete      "The method of claim 1, the method further comprises:"

and insert      --An image processing method comprising:--, therefor.

Signed and Sealed this  
Twenty-fourth Day of November, 2015

Michelle K. Lee  
*Director of the United States Patent and Trademark Office*